(12) United States Patent
Kinoshita et al.

(10) Patent No.: US 7,237,657 B2
(45) Date of Patent: Jul. 3, 2007

(54) FRICTION PLATE

(75) Inventors: Yoshio Kinoshita, Shizuoka-ken (JP); Shun Kitahara, Shizuoka-ken (JP); Tamotsu Fujii, Shizuoka-ken (JP)

(73) Assignee: NSK-Warner K.K., Tokyo (JP)

(*) Notice: Subject to any disclaimer, the term of this patent is extended or adjusted under 35 U.S.C. 154(b) by 176 days.

(21) Appl. No.: 11/043,082

(22) Filed: Jan. 27, 2005

(65) Prior Publication Data
US 2005/0167215 A1    Aug. 4, 2005

(30) Foreign Application Priority Data
Jan. 29, 2004 (JP) ............................. 2004-022295

(51) Int. Cl.
*F16D 65/853* (2006.01)
(52) U.S. Cl. ................. 188/71.6; 188/264 CC
(58) Field of Classification Search ............... 188/71.5, 188/71.6, 264 R, 264 B, 264 D, 264 E, 264 F, 188/264 CC, 250 R, 251 R, 251 A, 251 M, 188/250 G, 250 B; 192/113.1, 113.3, 113.31
See application file for complete search history.

(56) References Cited
U.S. PATENT DOCUMENTS

| | | | | |
|---|---|---|---|---|
| 3,390,750 A | * | 7/1968 | Albertson | ............... 188/251 M |
| 3,932,568 A | * | 1/1976 | Watts et al. | ............. 188/251 A |
| 5,094,331 A | | 3/1992 | Fujimoto et al. | |
| 5,240,095 A | * | 8/1993 | Shimamura et al. | ...... 192/113.1 |
| 5,730,259 A | * | 3/1998 | Umezawa | ............... 188/250 G |
| 5,950,991 A | * | 9/1999 | Patel et al. | ................. 188/71.5 |
| 5,998,311 A | * | 12/1999 | Nels | ....................... 188/264 E |
| 6,029,782 A | * | 2/2000 | Chojecki et al. | ........... 188/71.6 |

FOREIGN PATENT DOCUMENTS

| | | |
|---|---|---|
| JP | A-50-30145 | 4/1975 |
| JP | A-01-146019 | 10/1989 |

* cited by examiner

*Primary Examiner*—Thomas Williams
(74) *Attorney, Agent, or Firm*—Crowell & Moring LLP

(57) ABSTRACT

A friction plate is formed of a core plate and friction linings bonded on opposite surfaces of the friction plate, respectively. To permit cooling of each friction lining from a side of its associated surface of the core plate, the friction plate is provided, for example, with oilways or grooves arranged on the associated surface of the core plate, adhesive-free parts existing on he associated surface of the core plate, or loosely-packed portions existing in the friction lining such that lube oil is also facilitated to enter each friction lining from the side of the associated surface of the core plate.

1 Claim, 7 Drawing Sheets

FRICTION PLATE

FIELD OF THE INVENTION

This invention relates to a friction plate useful in an automatic transmission or the like.

DESCRIPTION OF THE BACKGROUND

FIG. 1 is a cross-sectional view showing the basic construction of a multiplate clutch 10 in which friction plates are used. The drawing shows a clutch case 1, friction plates 2, separator plates 3, a piston 4, a backing plate 5, and a stopper ring 6. The friction plates 2 are connected to a hub (not shown) through splines, while the separator plates 3 are connected to the clutch case 1 through splines. An alternate long and short dash line X-X indicates a central axis.

To bring the clutch into engagement, pressure oil is introduced between the clutch case 1 and the piston 4 such that against the backing plate 5 held in place by the stopper ring 6, the friction plates 2 and separator plates 3 are pressed via the piston 4. As a consequence, a torque is transmitted between the clutch case 1 and the unillustrated hub.

FIG. 13 is a front view illustrating one example of conventional friction plate constructions (see, for example, Fujimoto, et al. U.S. Pat. No. 5,094,331, JP-A-50-30145[U], and JP-A-01-146019[U]). A friction plate 2 is formed of a metal plate, as a core plate 21, and friction linings 25 bonded on opposite surfaces of the core plate 21, respectively. Designated at numeral 24 are splines through which the friction plate 2 is connected to an unillustrated hub. To facilitate flowing of lube oil into each friction lining 25 so that the friction lining 25 can be cooled with the lube oil, the friction lining 25 is provided with oilways 28 and oil grooves 29. The oilways 28 communicate to both inner and outer circumferential walls of the friction lining 25, while the oil grooves 29 are open only in the inner circumferential wall of the friction lining 25.

In machinery, there is an outstanding desire for still higher power output, still higher efficiency and further reductions in size. Friction plates for use in such machinery develop an inconvenience that the cooling of their friction linings is not sufficient insofar as they are constructed by simply arranging oilways and oil grooves in their friction linings as in the conventional art. A need, therefore, has arisen to achieve a further improvement in the cooling performance for friction linings.

SUMMARY OF THE INVENTION

To solve the above-described inconvenience, the present invention provides a friction plate formed of a core plate and friction linings bonded on opposite surfaces of the friction plate, respectively. The friction plate comprises means for cooling each friction lining from a side of its associated surface of the core plate.

Owing to the above-described cooling means, lube oil is also facilitated to enter each friction lining on the side of its associated surface of the core plate.

DETAILED DESCRIPTION OF THE INVENTION

In the present invention, a core plate is provided on opposite surfaces thereof with oilways or oil grooves, or instead of bonding friction linings to the entire areas of opposite surfaces of a core plate, the core plate is provided on each surface thereof with adhesive-free parts in a desired pattern, or friction linings bonded on opposite surfaces of a core plate each includes densely-packed portions and loosely-packed portions.

The term "oilways" as used herein means recesses or depressions, which are arranged on each surface of a core plate and do not axially extend through the core plate. Accordingly, the term "oilways" include not only those communicating to both the outer and inner peripheral walls of the core plate but also include those having openings only in the outer peripheral wall or the inner peripheral wall of the core plate. The term "oil grooves", on the other hand, means grooves having openings in only one of the outer and inner peripheral walls of the core plate and axially extending through the core plate.

Figure 1:
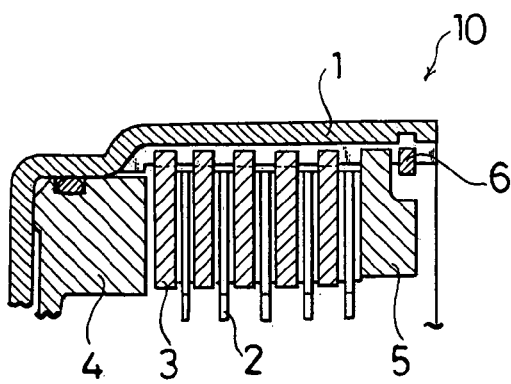
FIG. 1 is a cross-sectional view showing the fundamental construction of a multiplate clutch.
Figure 2:
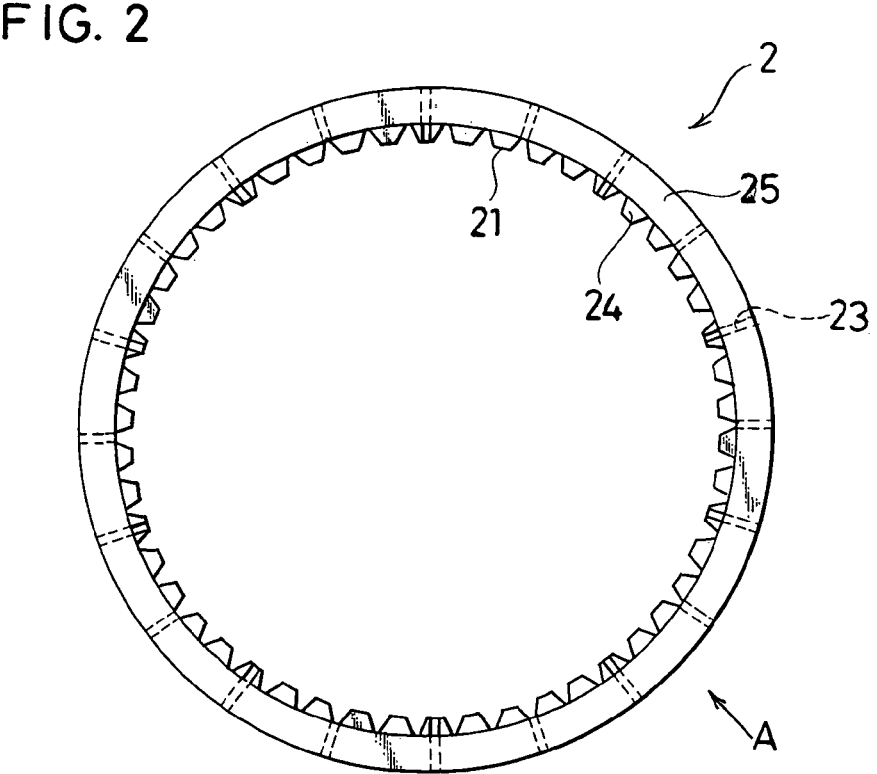
FIG. 2 is a front view showing a friction plate according to a first embodiment of the present invention.
Figure 3:
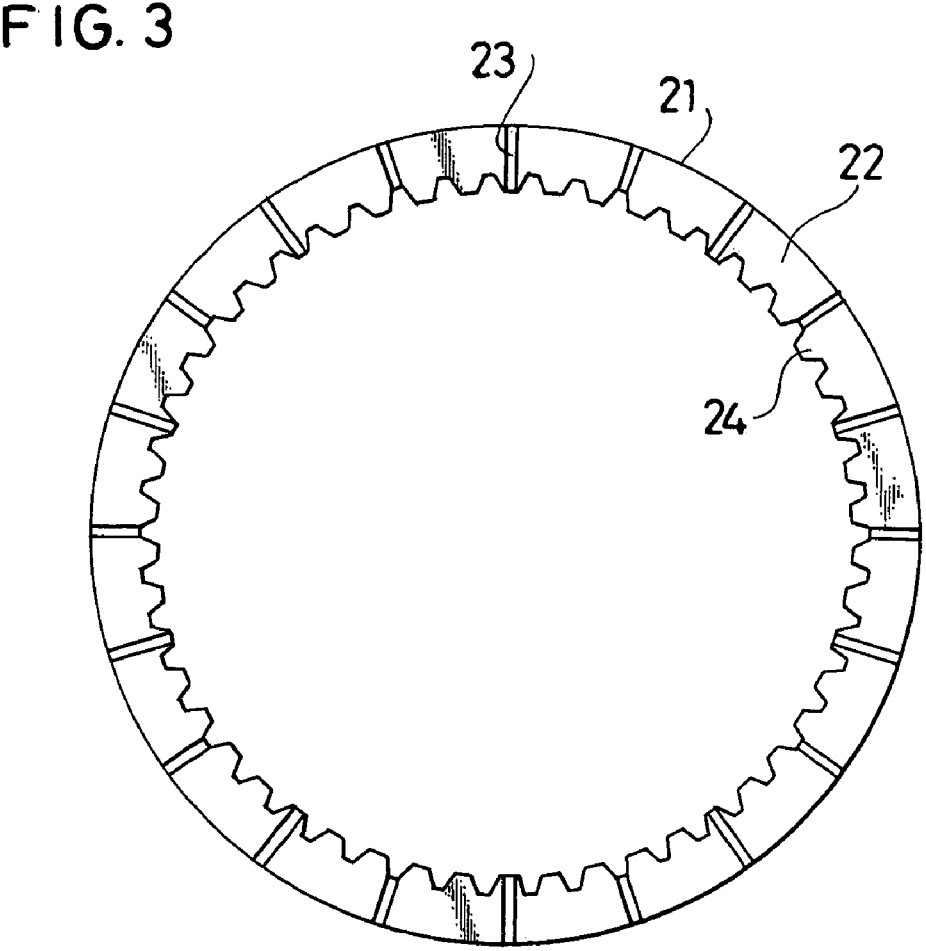
FIG. 3 is a front view of only a core plate taken out of-the friction plate of FIG. 2.
Figure 4:
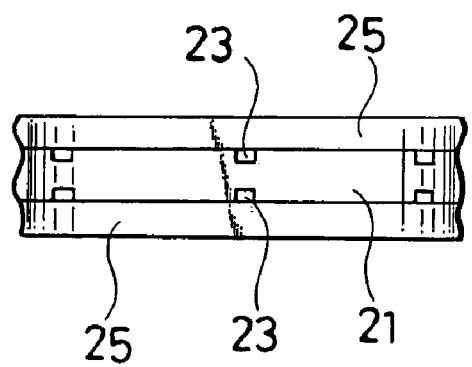
FIG. 4 is a fragmentary end view of the friction plate of FIG. 2 as viewed in the direction of arrow A.

Referring firstly to FIGS. 2 through 4, a friction plate according to the first embodiment of the present invention will be described. A friction lining 25 is bonded on each surface 22 of a metal-made core plate 21. Numeral 24 indicates splines through which the friction plate 2 is connected to an unillustrated hub.

On the surface 22 of the core plate 21, oilways 23 are arranged in the form of recesses or depressions such that the oilways 23 do not axially extend through the core plate 21. In the illustrated embodiment, the oilways 23 communicate to both the inner peripheral wall and the outer peripheral wall of the core plate 21. As mentioned above, however, the oilways 23 are not absolutely required to communicate to both the inner peripheral wall and the outer peripheral wall of the core plate 21, and can be those having openings in only one of the outer and inner peripheral walls of the core plate 21.

Figure 5:
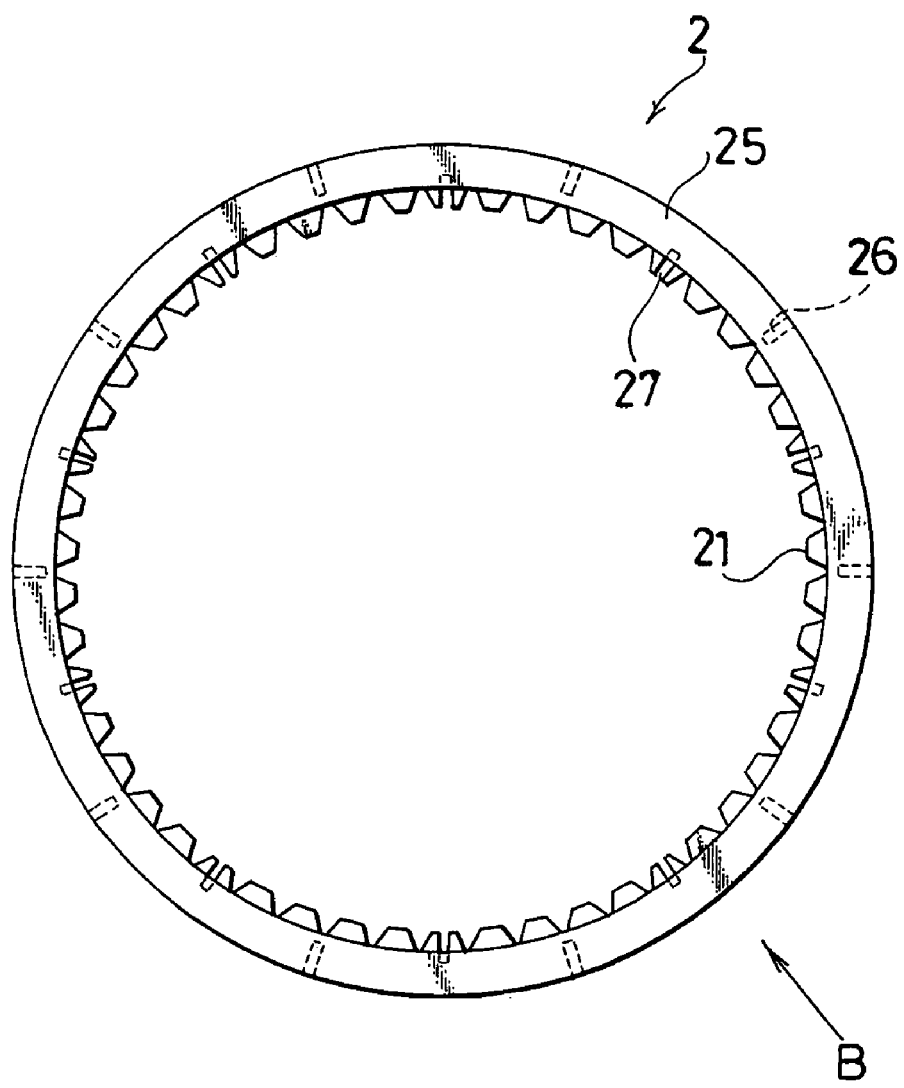
FIG. 5 is a front view showing a friction plate according to a second embodiment of the present invention.
Figure 6:
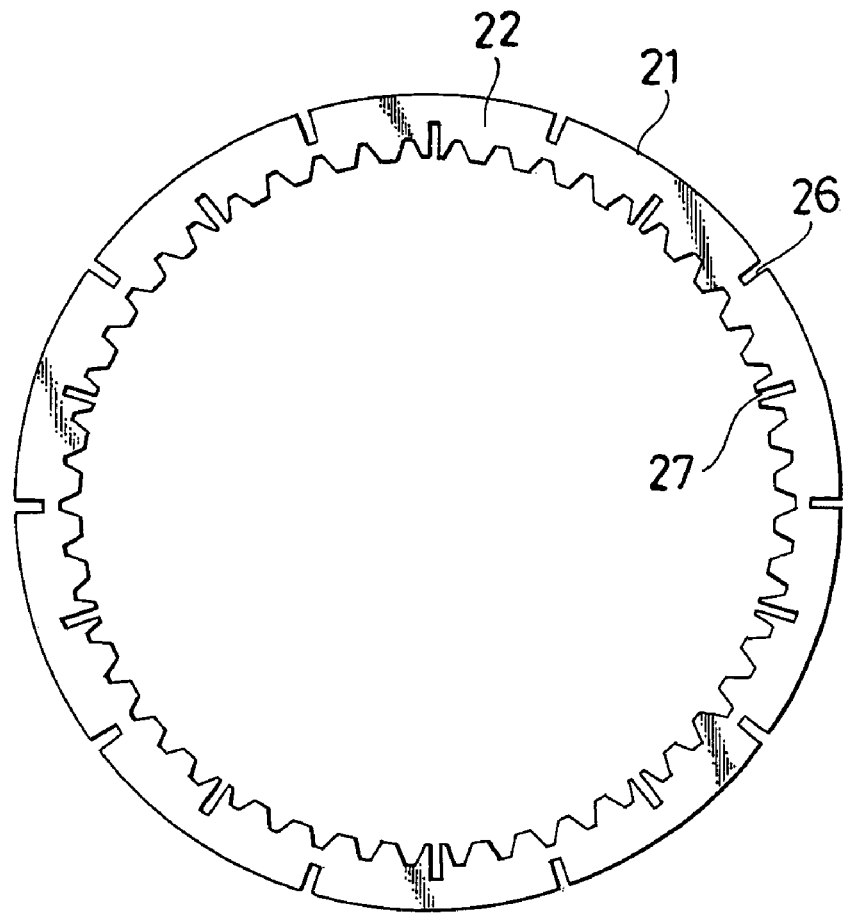
FIG. 6 is a front view of only a core plate taken out of the friction plate of FIG. 5.
Figure 7:
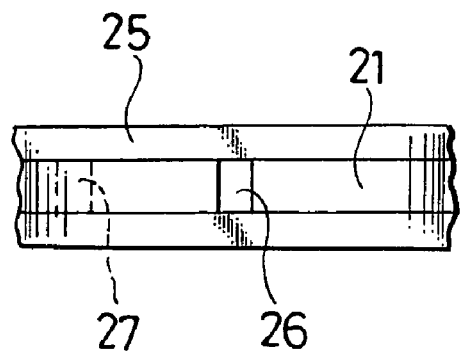
FIG. 7 is a fragmentary end view of the friction plate of FIG. 5 as viewed in the direction of arrow B.

With reference to FIGS. 5 through 7, a friction plate according to the second embodiment of the present invention will next be described. The second embodiment is similar to the first embodiment in that a friction lining 25 is bonded on each surface 22 of a core plate 21. In this second embodiment, the core plate 21 is provided on each surface thereof with oil grooves, which open in only one of inner and outer peripheral walls of the core plate 21 and axially extend through the core plate 21.

In FIGS. 5 through 7, the core plate 21 is provided on each surface thereof with outer-periphery-side grooves 26 and inner-periphery-side grooves 27. The outer-periphery-side grooves 26 have openings in the outer peripheral wall of the core plate 21 and axially extend through the core plate 21, while the inner-periphery-side grooves 27 have openings in the inner peripheral wall of the core plate 21 and axially extend through the core plate 21.

With reference to FIGS. 8 through 11, a friction plate according to the third embodiment of the present invention and friction plates according to the first to third modifications of the third embodiment will next be described. Instead of providing a core plate with oilways (as in the first embodiment) or with oil grooves (as in the second embodiment) on each of its opposite surfaces, an adhesive is not applied to the entire area of each surface 22 of a core plate 21 upon bonding an associated friction lining on the surface 22 of the core plate 21. The adhesive is applied only to predetermined (in other words, selected) areas of the surface 22 such that adhesive-coated parts 31 indicated by dashed lines and adhesive-free parts 32 indicated by blank parts are arranged. By forming the friction plate as described above, lube oil is also facilitated to flow onto each surface 22 of the core plate 21 at the adhesive-free areas thereof and to cool the friction lining from the side of the associated surface 22.

The shape, number and the like of the adhesive-free parts 32 can be changed at will as indicated by way of examples in FIGS. 8 to 11, respectively. In addition, the adhesive thickness and the like of the adhesive-coated parts 31 can also be determined as desired.

Figure 8:
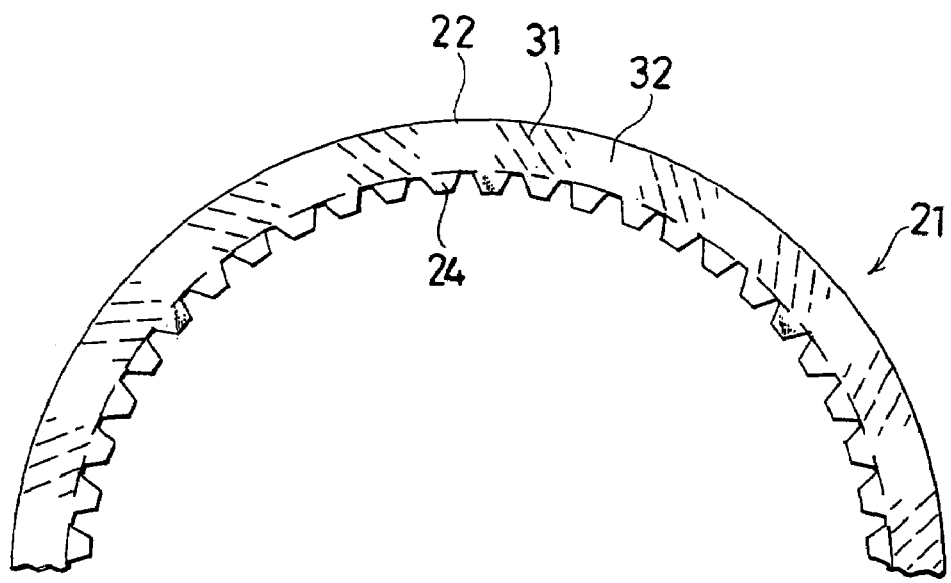
FIG. 8 is a fragmentary front view showing a friction plate according to a third embodiment of the present invention.
Figure 9:
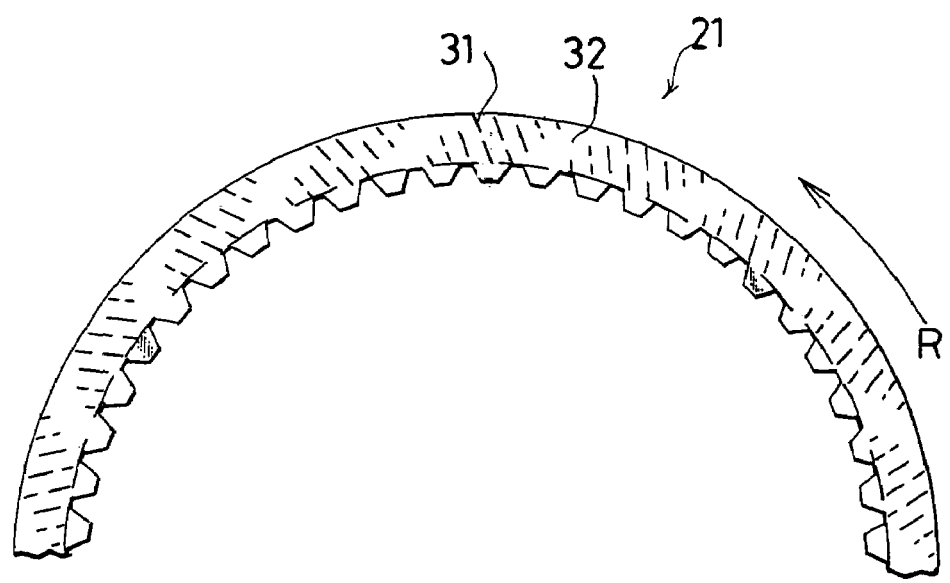
FIG. 9 is a fragmentary front view showing a friction plate according to a first modification of the third embodiment of the present invention.
Figure 10:
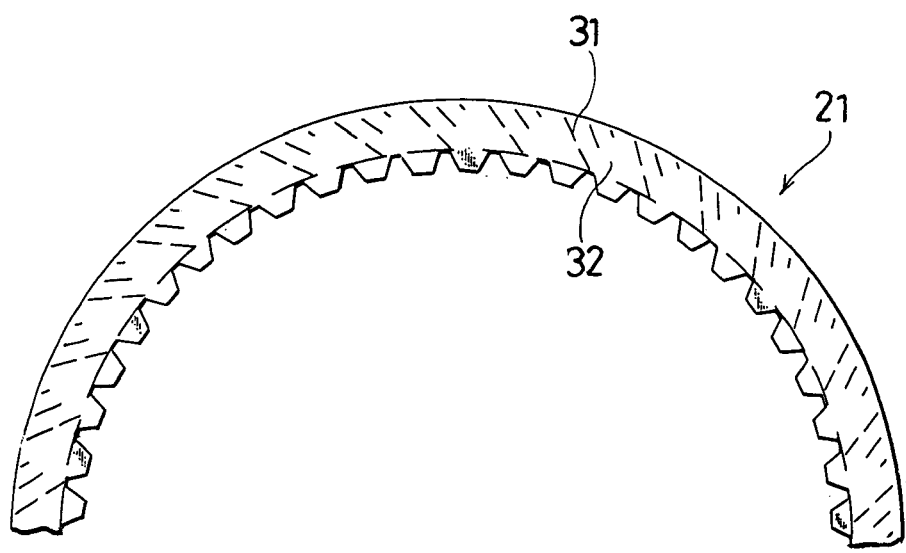
FIG. 10 is a fragmentary front view showing a friction plate according to a second modification of the third embodiment of the present invention.
Figure 11:
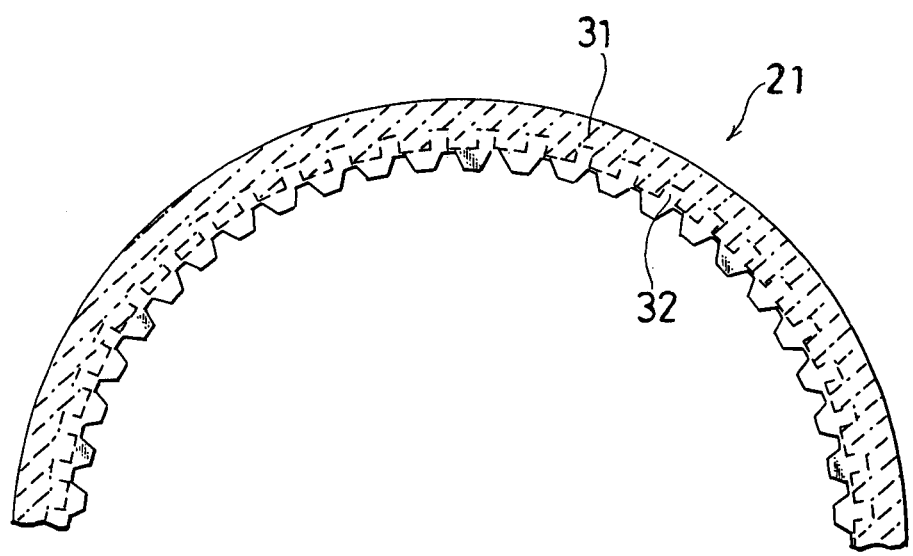
FIG. 11 is a fragmentary front view showing a friction plate according to a third modification of the third embodiment of the present invention.

In FIG. 8, the adhesive-free parts 32 extend in a radial direction such that they communicate to both inner and outer peripheral walls of the core plate 21. In the first modification shown in FIG. 9, the non-bonded parts 32 which communicate to both inner and outer peripheral walls of the core plate 21 are inclined in a direction opposite to the direction of rotation (indicated by arrow R) of the friction plate 21. In the second modification depicted in FIG. 10, the adhesive-free parts 32 are formed wider on the side of the inner peripheral wall and narrower on the side of the outer peripheral wall. In the third modification illustrated in FIG. 11, the adhesive-free parts 32 have a predetermined width from the side of the inner peripheral wall to an approximately central distance at predetermined locations.

Figure 12:
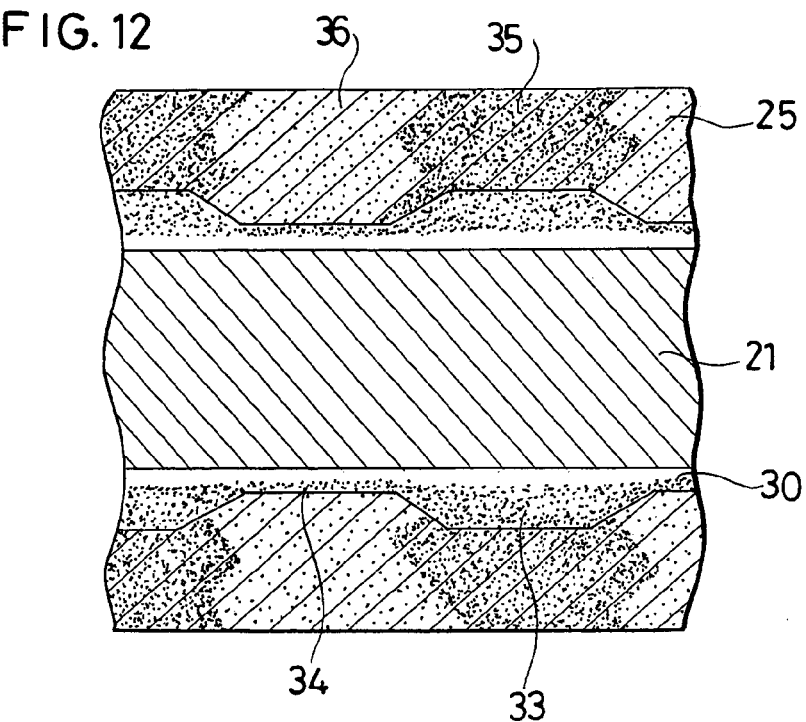
FIG. 12 is a fragmentary end view of a friction plate according to a fourth embodiment of the present invention.
Figure 13:
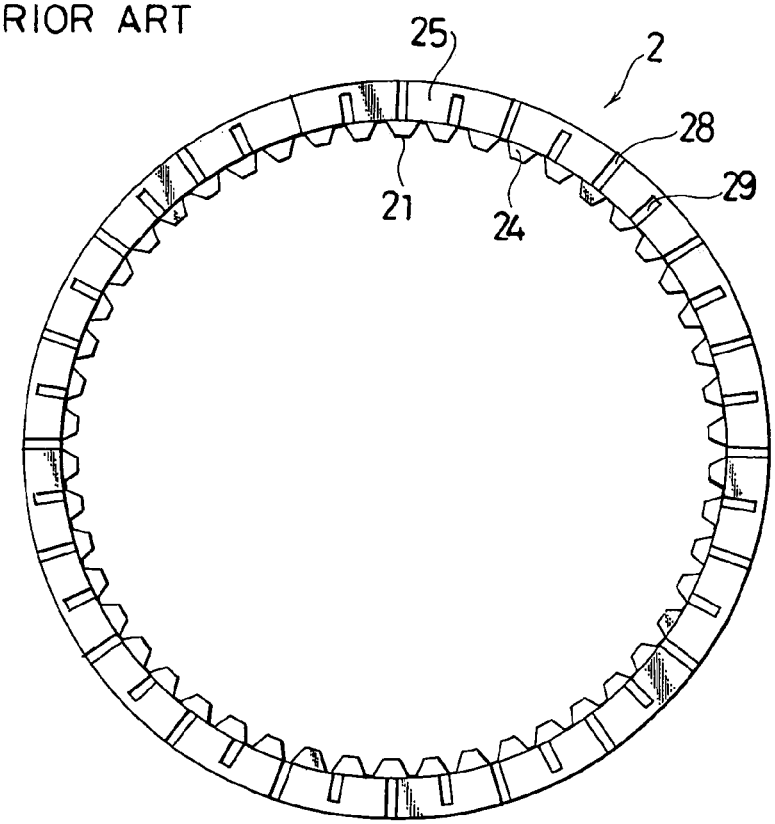
FIG. 13 is a front view showing a conventional friction plate.

Referring finally to FIG. 12, a friction plate according to the fourth embodiment of the present invention will be described. In this embodiment, upon applying an adhesive 30 onto each surface of a core plate 21, the adhesive 30 is not applied with a uniform thickness but is applied such that the resulting adhesive layer includes thickly-coated portions 33 and thinly-coated portions 34. A friction lining 25 is placed over the thickly-coated portions 33 and thinly-coated portions 34, and is compression-bonded to the associated surface of the core plate 21 via the adhesive 30 such that the friction lining 25 presents a flat surface. As a result of this compression bonding, the inside of the friction lining is densely packed (to form densely-packed portions) at areas where the friction lining 25 is in contact with the thickly-coated portions 33 of the adhesive 30, but is loosely packed (to form loosely-packed portions) at areas where the friction lining 25 is in contact with the thinly-coated portions 34 of the adhesive 30. Lube oil is, therefore, facilitated to enter the loosely-packed portions 36 of the friction lining 25 so that the friction lining 25 can be also cooled from the side of its associated surface of the core plate 21.

As the material of the friction linings in each of the above-described embodiments, a preferred material can be chosen from conventionally-known friction materials, for example, as disclosed in Suzuki, et al. U.S. Pat. No. 6,586,373 and Quigley U.S. Pat. No. 5,713,450.

In the friction plate according to the present invention, a great deal of lube oil can be fed to each friction lining even on the side of its associated surface of the core plate. As a result, the cooling performance for the friction lining is significantly improved. The friction plate according to the present invention is, therefore, useful in high-output and high-efficiency machinery.

This application claims the priority of Japanese Patent Application 2004-022295 filed Jan. 29, 2004, which is incorporated herein by reference.

The invention claimed is:

1. A friction plate formed of a core plate and friction linings bonded on opposite surfaces of said friction plate, respectively, comprising:

means for cooling each friction lining from a side of its associated surface of said core plate, wherein said friction lining has densely-packed portions and loosely-packed portions through which lube oil is allowed to enter said friction lining, and said loosely-packed portions act as said cooling means, and said densely-packed portions and loosely-packed portions in said friction lining have been formed by applying an adhesive, which acts to bond said core plate and said friction lining with each other, thickly at predetermined areas of said associated surface and thinly at remaining areas of said associated surface of said core plate and then compression-bonding said friction lining to said associated surface via said adhesive such that said friction lining presents a flat surface.

* * * * *